US012753708B2

(12) United States Patent
Pellerin

(10) Patent No.: US 12,753,708 B2
(45) Date of Patent: Oct. 6, 2026

(54) DEAERATOR IMPELLER ROTOR WITH GEAR ROTOR

(71) Applicant: Pratt & Whitney Canada Corp., Longueuil (CA)

(72) Inventor: Hugues Pellerin, Montreal (CA)

(73) Assignee: Pratt & Whitney Canada Corp., Longueuil (CA)

(*) Notice: Subject to any disclaimer, the term of this patent is extended or adjusted under 35 U.S.C. 154(b) by 270 days.

(21) Appl. No.: 18/377,469

(22) Filed: Oct. 6, 2023

(65) Prior Publication Data

US 2025/0116245 A1 Apr. 10, 2025

(51) Int. Cl.

*F01D 25/18* (2006.01)
*B01D 19/00* (2006.01)
*F02C 7/06* (2006.01)

(52) U.S. Cl.

CPC ......... *F01D 25/18* (2013.01); *B01D 19/0052* (2013.01); *F02C 7/06* (2013.01)

(58) Field of Classification Search

CPC ......... F01D 25/18; F01D 25/32; B01D 19/00; B01D 19/0042; B01D 19/0052; B01D 19/0073; B01D 19/0094; B01D 19/02; B01D 45/14; F02C 7/06; F16N 39/002; F05D 2210/132; F05D 2260/609

See application file for complete search history.

(56) References Cited

U.S. PATENT DOCUMENTS

| | | | | |
|---|---|---|---|---|
| 3,712,032 | A * | 1/1973 | Obligado | B01D 45/14 55/409 |
| 6,033,450 | A * | 3/2000 | Krul | B01D 45/14 55/438 |
| 7,063,734 | B2 | 6/2006 | Latulipe | |
| 10,183,239 | B2 | 1/2019 | Grosskopf | |
| 11,060,456 | B2 * | 7/2021 | Fulleringer | F01D 25/18 |
| 11,401,863 | B2 * | 8/2022 | Pajard | B01D 45/16 |
| 11,433,336 | B2 | 9/2022 | Pereira | |
| 11,674,406 | B2 | 6/2023 | Baker-Ostiguy | |
| 11,719,243 | B2 | 8/2023 | Baker-Ostiguy | |
| 12,510,082 | B1 * | 12/2025 | Baker-Ostiguy | F04D 9/003 |
| 2016/0138444 | A1 | 5/2016 | Prunera-Usach | |
| 2021/0131322 | A1 | 5/2021 | Nifenecker | |
| 2023/0044147 | A1 | 2/2023 | Baker-Ostiguy | |
| 2023/0044553 | A1 | 2/2023 | Baker-Ostiguy | |
| 2024/0084717 | A1 | 3/2024 | Marsaudon | |

OTHER PUBLICATIONS

EP search report for EP24205003.7 dated Mar. 26, 2025.

* cited by examiner

*Primary Examiner* — William H Rodriguez
(74) *Attorney, Agent, or Firm* — Getz Balich LLC

(57) ABSTRACT

A fluid system is provided for a powerplant. This fluid system includes a gear rotor and a deaerator impeller rotor. The gear rotor is rotatable about an axis. The gear rotor includes a web, a toothed rim and a plurality of liquid ports. The web projects radially inward towards the axis from the toothed rim. The toothed rim circumscribes the web. Each of the liquid ports extends axially through the web. The deaerator impeller rotor is mounted to and rotatable with the gear rotor about the axis. The deaerator impeller rotor includes a fluid inlet, a liquid outlet and a gas outlet. The fluid inlet is upstream of and is fluidly coupled to the liquid outlet and the gas outlet. The liquid outlet is axially adjacent the gear rotor and is fluidly coupled to the liquid ports.

16 Claims, 5 Drawing Sheets

DEAERATOR IMPELLER ROTOR WITH GEAR ROTOR

TECHNICAL FIELD

This disclosure relates generally to a fluid system and, more particularly, to a deaerator for an engine or another system.

BACKGROUND INFORMATION

Rotational equipment such as a gas turbine engine may include a deaerator for separating a fluid into its liquid and gas components. Various types and configurations of deaerators are known in the art. While these known deaerators have various benefits, there is still room in the art for improvement.

SUMMARY

According to an aspect of the present disclosure, a fluid system is provided for a powerplant. This fluid system includes a gear rotor and a deaerator impeller rotor. The gear rotor is rotatable about an axis. The gear rotor includes a web, a toothed rim and a plurality of liquid ports. The web projects radially inward towards the axis from the toothed rim. The toothed rim circumscribes the web. Each of the liquid ports extends axially through the web. The deaerator impeller rotor is mounted to and rotatable with the gear rotor about the axis. The deaerator impeller rotor includes a fluid inlet, a liquid outlet and a gas outlet. The fluid inlet is upstream of and is fluidly coupled to the liquid outlet and the gas outlet. The liquid outlet is axially adjacent the gear rotor and is fluidly coupled to the liquid ports.

According to another aspect of the present disclosure, another fluid system is provided for a powerplant. This fluid system includes a gear rotor and a deaerator impeller rotor. The gear rotor is rotatable about an axis. The gear rotor includes a shaft and a gear formed integral with the shaft. The deaerator impeller rotor is fixed to the gear rotor. The deaerator impeller rotor circumscribes the shaft and is abutted axially against the gear. The deaerator impeller rotor includes a vane structure, a network of passages, a fluid inlet, a liquid outlet and a gas outlet. The vane structure at least partially forms the network of passages within the deaerator impeller rotor. The network of passages fluidly couples the fluid inlet to the liquid outlet and the gas outlet in parallel.

According to still another aspect of the present disclosure, another fluid system is provided for a powerplant. This fluid system includes a shaft, a deaerator impeller rotor and a gear. The shaft is rotatable about an axis. The deaerator impeller rotor circumscribes and is formed integral with the shaft. The deaerator impeller rotor includes a vane structure, a network of passages, a fluid inlet, a liquid outlet and a gas outlet. The vane structure at least partially forms the network of passages within the deaerator impeller rotor. The network of passages fluidly couples the fluid inlet to the liquid outlet and the gas outlet. The gear circumscribes and is formed integral with the deaerator impeller rotor. The gear is arranged axially between: (a) the fluid inlet to a first side of the gear; and (b) the liquid outlet and the gas outlet to a second side of the gear.

The deaerator impeller rotor may include a shroud. The vane structure may include a first sidewall, a second sidewall and a plurality of vanes arranged circumferentially about the axis. The vanes may include a first vane, and the first vane may include a first portion, a second portion and a third portion. The first portion may be axially between the first sidewall and the second sidewall. The second portion may be radially between the first sidewall and the shroud. The third portion may be radially between the second sidewall and the shroud. The gear may be axially aligned with the first sidewall.

The gear rotor may include a plurality of liquid ports and/or a plurality of gas ports. The liquid ports may project axially through the gear and may be fluidly coupled to the network of passages through the liquid outlet. The gas ports may project axially through the gear and may be fluidly coupled to the network of passages through the gas outlet.

The deaerator impeller rotor may be mounted to the gear rotor by an interference fit between the deaerator impeller rotor and the gear rotor.

The deaerator impeller rotor may be mounted to the gear rotor by one or more bolts.

The deaerator impeller rotor may be mounted to the gear rotor by a nut.

The gear rotor may also include a shaft and a gear. The shaft may extend axially through an inner bore of the deaerator impeller rotor. The gear may include the web and the toothed rim. The web may project radially inward towards the axis from the toothed rim to the shaft.

The gear may be formed integral with the shaft.

A hub of the deaerator impeller rotor may be connected to the shaft by an interference fit between the hub of the deaerator impeller rotor and the shaft.

A flange of the deaerator impeller rotor may be connected to the gear by one or more fasteners.

A hub of the deaerator impeller rotor may be mounted on the shaft and clamped axially between the gear and a nut threaded onto the shaft.

The gear rotor may also include a plurality of gas ports. Each of the gas ports may extend axially through the web. The gas outlet may be axially adjacent the gear rotor and may be fluidly coupled to the gas ports.

The liquid ports may be disposed radially outboard of the gas ports.

The liquid outlet may be radially outboard of and may circumscribe the gas outlet.

The fluid inlet may be an annular fluid inlet into the deaerator impeller rotor. In addition or alternatively, the liquid outlet may be an annular liquid outlet out from the deaerator impeller rotor. In addition or alternatively, the gas outlet may be an annular gas outlet out from the deaerator impeller rotor.

The deaerator impeller rotor may also include a vane structure and a network of passages. The vane structure may at least partially form the network of passages within the deaerator impeller rotor. The network of passages may fluidly couple the fluid inlet to the liquid outlet and the gas outlet in parallel.

The network of passages may include a fluid inlet passage, a liquid outlet passage and/or a gas outlet passage. The fluid inlet passage may project axially into the deaerator impeller rotor from the fluid inlet. The liquid outlet passage may project axially into the deaerator impeller rotor from the liquid outlet. The gas outlet passage may project radially, in a radial outward direction away from the axis, into the deaerator impeller rotor from the gas outlet.

The deaerator impeller rotor may also include a shroud. The vane structure may include a first sidewall, a second sidewall and a plurality of vanes arranged circumferentially about the axis. The vanes may include a first vane, and the first vane may include a first portion, a second portion and a third portion. The first portion may be axially between the first sidewall and the second sidewall. The second portion may be radially between the first sidewall and the shroud. The third portion may be radially between the second sidewall and the shroud.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
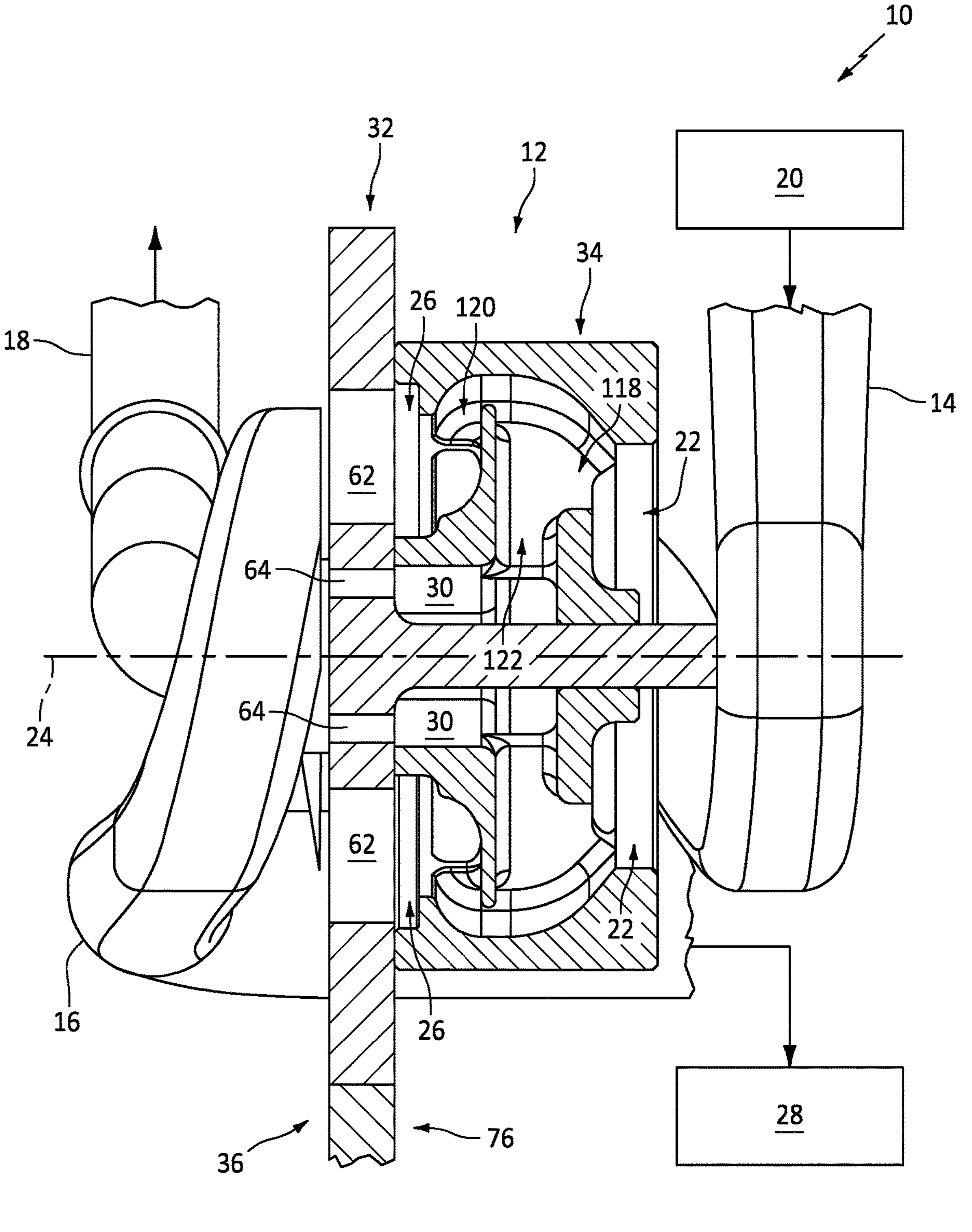
FIG. 1 is a partial cutaway illustration of a fluid system for an aircraft powerplant.

FIG. 1 partially illustrates a fluid system 10 for a powerplant of an aircraft. For ease of description, the aircraft powerplant is described below as an engine. This engine may be configured as a gas turbine engine, a rotary engine (e.g., a Wankel engine), a reciprocating piston engine or any other type of internal combustion engine. The aircraft may be configured as an airplane, a helicopter, a drone (e.g., an unmanned aerial vehicle (UAV)) or any other manned or unmanned aerial vehicle or system. The present disclosure, however, is not limited to aircraft applications. The engine, for example, may alternatively be configured as an industrial gas turbine engine or any other non-aircraft engine or system which utilizes a deaerated liquid/aerates liquid during operation. In another example, the aircraft powerplant may alternatively be configured as or otherwise include an electric machine; e.g., an electric motor, an electric generator or a motor-generator.

The fluid system 10 of FIG. 1 is configured as or otherwise includes a deaerator for the engine. More particularly, the fluid system 10 is configured to deaerate a fluid for the engine, which fluid includes a mixture of a liquid (e.g., lubricant) and a gas (e.g., air). The fluid system 10 of FIG. 1, for example, includes a deaerator rotating structure 12 (shown in side sectional view), a fluid inlet conduit 14, a liquid outlet conduit 16 and a gas outlet conduit 18. During fluid system operation, the fluid inlet conduit 14 directs a quantity of the fluid received from a fluid collection component 20 of the engine (e.g., a sump, a gutter, etc.) into the deaerator rotating structure 12 through a (e.g., annular) fluid inlet 22. The deaerator rotating structure 12 spins the received fluid therewithin about an axis 24 to separate out the gas from the liquid. Following this separation (e.g., deaeration), the liquid (e.g., without any of or with very little of the gas) is directed (e.g., propelled) out of the deaerator rotating structure 12 through a (e.g., annular) liquid outlet 26 into the liquid outlet conduit 16, and the liquid outlet conduit 16 may provide (e.g., return) the liquid to the engine for lubricating, cooling and/or otherwise servicing one or more engine components 28. The gas (e.g., without any of or with very little of the liquid) is directed (e.g., propelled) out of the deaerator rotating structure 12 through a (e.g., annular) gas outlet 30 into the gas outlet conduit 18, and the gas outlet conduit 18 may exhaust (e.g., vent) the gas to ambient or another volume within or outside of the engine.

The deaerator rotating structure 12 includes a deaerator gear rotor 32 and a deaerator impeller rotor 34 that is rotatable with the gear rotor 32 about the axis 24. The gear rotor 32 is configured to operatively couple the deaerator rotating structure 12 and its impeller rotor 34 to a mechanical power source through a geartrain 36 that includes or is otherwise coupled to the gear rotor 32. Examples of the power source include, but are not limited to, a rotating assembly (e.g., a spool) of the engine, an electric motor and a fluid motor. The impeller rotor 34 is configured to spin the fluid within the deaerator rotating structure 12 to separate out the gas from the liquid. The deaerator rotating structure 12 may also or alternatively extract energy from the fluid entering through the fluid inlet 22 and transmit that extracted energy into the geartrain 36. The fluid energy of the fluid flowing into the deaerator may thereby be recuperated and utilized. Here, the deaerator may be mounted in series with one or more pump, where the energy extracted by the deaerator can be provided to the pump(s). Such an arrangement may be useful to alleviate torque extraction from the engine.

Figure 2:
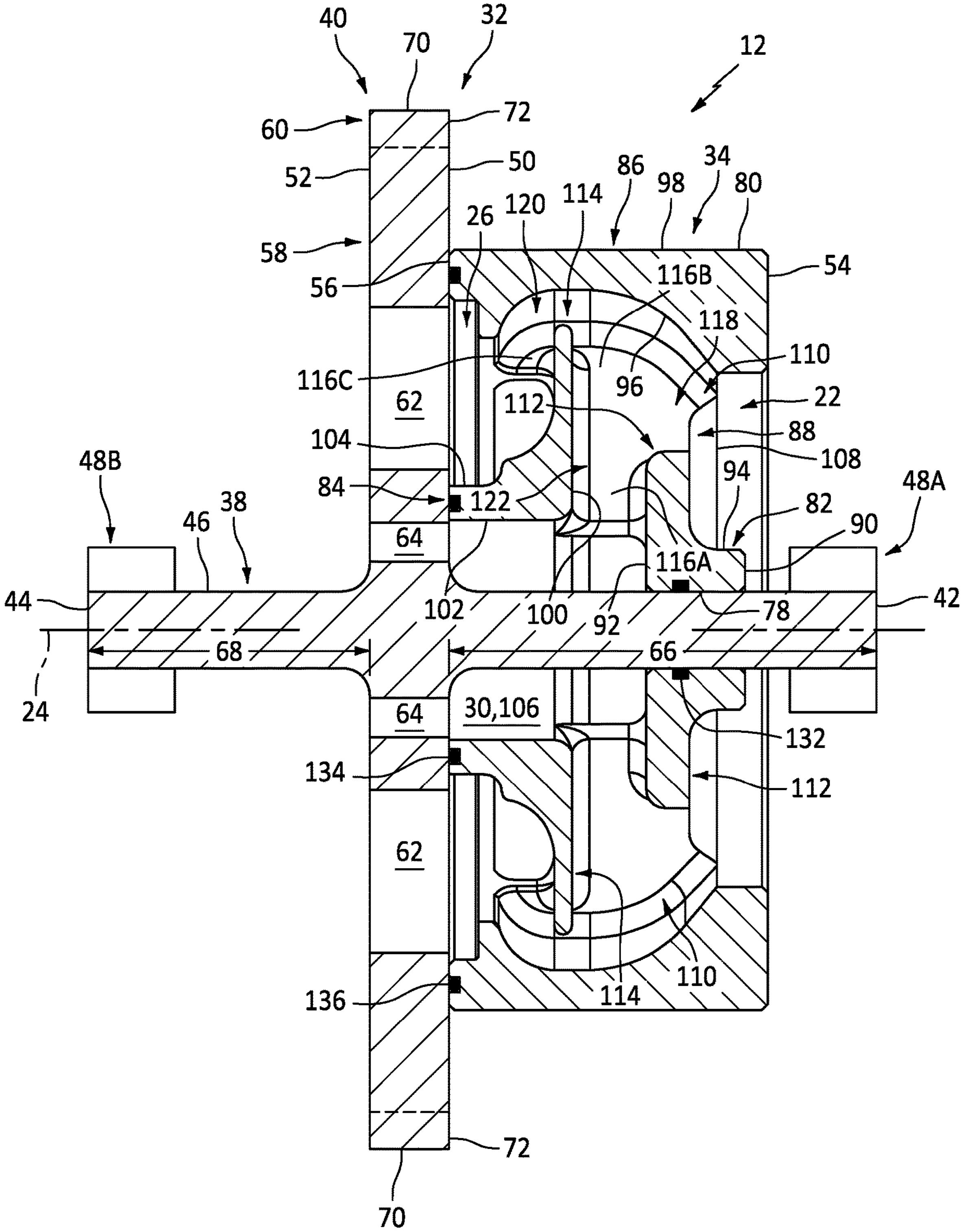
FIG. 2 is a sectional illustration of a deaerator rotating structure arranged with a set of bearings.

Referring to FIG. 2, the gear rotor 32 includes a gear rotor shaft 38 and a gear rotor gear 40. The rotor shaft 38 extends axially along the axis 24 between and to an axial first end 42 of the rotor shaft 38 and an axial second end 44 of the rotor shaft 38. Each of these shaft ends 42, 44 may also be a respective axial end of the gear rotor 32. The rotor shaft 38 may be a solid shaft (or alternatively hollow). The rotor shaft 38 of FIG. 2, for example, projects radially out from the axis 24 to a radial outer side 46 of the rotor shaft 38. The rotor shaft 38 of FIG. 2 is rotatably supported by one or more bearings 48A and 48B (generally referred to as "48"); e.g., rolling element bearings, journal bearings, etc. These bearings 48 are mounted onto the rotor shaft 38 at its shaft outer side 46. Each of the bearings 48 rotatably couples the rotor shaft 38 to a stationary structure (not shown for clarity of illustration); e.g., a housing for the deaerator rotating structure 12. Here, the bearings 48 are disposed to opposing axial sides 50 and 52 of the rotor gear 40 as well as to opposing axial sides 54 and 56 of the impeller rotor 34. The first bearing 48A of FIG. 2, for example, is arranged at (e.g., on, adjacent or proximate) the shaft first end 42, and the second bearing 48B is arranged at the shaft second end 44.

The rotor gear 40 of FIG. 2 includes a gear web 58, a gear toothed rim 60 and one or more gear ports 62 and 64; e.g., through-holes, windows, etc. The rotor gear 40 and its web 58 are connected to (e.g., formed integral with or may otherwise be attached to) the rotor shaft 38. The web 58 projects radially out from the rotor shaft 38 at its shaft outer side 46 to the toothed rim 60. The web 58 extends circumferentially around (e.g., circumscribes) the rotor shaft 38. The web 58 extends axially between and to (or about) the gear first side 50 and the gear second side 52. The gear first side 50 is axially offset (e.g., spaced) from the shaft first end 42 along the axis 24 by a first axial distance 66. The gear second side 52 is axially offset (e.g., spaced) from the shaft second end 44 along the axis 24 by a second axial distance 68. The first axial distance 66 may be different (e.g., greater) than the second axial distance 68, which provides room for the impeller rotor 34 in the embodiment of FIG. 2.

Figure 3:
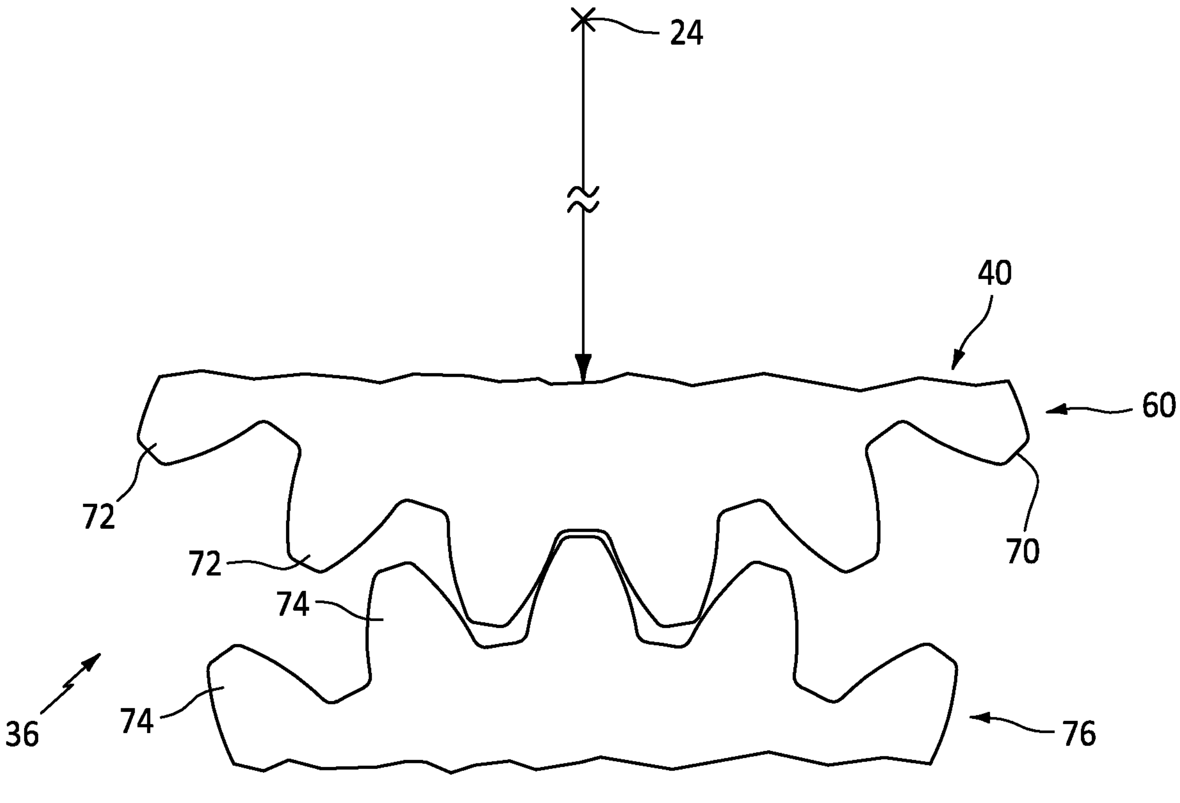
FIG. 3 is a partial side illustration at a meshed interface between gear teeth.

The toothed rim 60 is connected to (e.g., formed integral with or may otherwise be attached to) the web 58. The toothed rim 60 projects radially out from the web 58 to a distal radial outer end 70 of the rotor gear 40. The toothed rim 60 extends circumferentially around (e.g., circumscribes) the web 58 and the rotor shaft 38. The toothed rim 60 extends axially between the gear first side 50 and the gear second side 52. The toothed rim 60 includes a plurality of outward projecting gear teeth 72. These gear teeth 72 are arranged circumferentially about the axis 24 at the gear outer end 70. Referring to FIG. 3, the gear teeth 72 are configured to mesh with another set of gear teeth 74 of another gear 76 (e.g., a drive gear, or idler gear) in the geartrain 36.

Referring to FIG. 2, each of the gear ports 62, 64 projects axially through the rotor gear 40 and its web 58. The liquid ports 62 are arranged circumferentially about the axis 24 in a liquid port array; e.g., a circular array. The gas ports 64 are arranged circumferentially about the axis 24 in a gas port array; e.g., a circular array. These gas ports 64 are located radially inboard of the liquid port array and its liquid ports 62. The gas port array and its gas ports 64 of FIG. 2, for example, are disposed radially between the rotor shaft 38 and the liquid port array and its liquid ports 62. With this arrangement, the liquid port array circumscribes the gas port array. Each of the gas ports 64 may be circumferentially aligned with a respective one of the liquid ports 62 about the axis 24, and/or each of the liquid ports 62 may be circumferentially aligned with a respective one of the gas ports 64 about the axis 24. The present disclosure, however, is not limited to such an exemplary arrangement. Moreover, while FIG. 2 shows a one-to-one (1:1) relationship between the liquid ports 62 and the gas ports 64, the rotor gear 40 may include a different number of liquid ports 62 than gas ports 64 in other embodiments. The rotor gear 40, for example, may include more of the liquid ports 62 than the gas ports 64, or vice versa.

The impeller rotor 34 extends axially along the axis 24 between and to the rotor first side 54 and the rotor second side 56. The impeller rotor 34 extends (e.g., completely) circumferentially around the axis 24 providing the impeller rotor 34 with a full-hoop body. The impeller rotor 34 extends radially between and to a radial inner side 78 of the impeller rotor 34 and a radial outer side 80 of the impeller rotor 34. The impeller rotor 34 of FIG. 2 includes an impeller rotor hub 82, one or more impeller rotor shrouds 84 and 86 and an internal impeller rotor vane structure 88.

The rotor hub 82 extends axially along the axis 24 between and to an axial first side 90 of the rotor hub 82 and an axial second side 92 of the rotor hub 82. The hub first side 90 is axially offset (e.g., spaced) from the rotor first side 54 along the axis 24 by a third axial distance. The hub second side 92 is axially offset (e.g., spaced) from the rotor second side 56 along the axis 24 by a fourth axial distance. This fourth axial distance may be different (e.g., greater) than the third axial distance. However, in other embodiments, it is contemplated the rotor hub 82 may alternative extend axially to the rotor first side 54 and/or the rotor second side 56. Referring again to FIG. 2, the rotor hub 82 extends (e.g., completely) circumferentially around the axis 24. The rotor hub 82 extends radially from the rotor inner side 78 to a radial outer side 94 of the rotor hub 82.

The outer shroud 86 extends axially along the axis 24 between and to (or about) the rotor first side 54 and the rotor second side 56. The outer shroud 86 extends radially between and to a radial inner side 96 of the outer shroud 86 and a radial outer side 98 of the outer shroud 86, which outer shroud outer side 98 may be the same as the rotor outer side 80. The outer shroud 86 and its outer shroud inner side 96 are spaced radially outboard from the rotor hub 82 and its hub outer side 94. The outer shroud 86 extends (e.g., completely) circumferentially around the axis 24. The outer shroud 86 thereby circumscribes and axially overlaps the rotor hub 82 as well as the inner shroud 84.

The inner shroud 84 extends axially along the axis 24 between and to an axial first side 100 of the inner shroud 84 and the rotor second side 56. The inner shroud first side 100 is spaced axially from the hub second side 92 along the axis 24. The inner shroud 84 extends radially between and to a radial inner side 102 of the inner shroud 84 and a radial outer side 104 of the inner shroud 84. The inner shroud 84 and its inner shroud outer side 104 are spaced radially inboard from the outer shroud 86 and its outer shroud inner side 96. The inner shroud inner side 102 is also radially offset (e.g., spaced) outward from the rotor inner side 78. The inner shroud 84 extends (e.g., completely) circumferentially around the axis 24. With this arrangement, the inner shroud inner side 102 of FIG. 2 at least partially forms a rotor bore 106 within the impeller rotor 34. This rotor bore 106 projects axially along the axis 24 into the impeller rotor 34 from the rotor second side 56 to, for example, the rotor hub 82 and its hub second side 92.

The vane structure 88 extends axially along the axis 24 from a first side 108 of the vane structure 88 to (or about) the rotor second side 56. The vane structure 88 extends (e.g., completely) circumferentially around the axis 24. The vane structure 88 is arranged radially between and is connected to (e.g., formed integral with or may be otherwise attached to) (A) the rotor hub 82 and/or the inner shroud 84 and (B) the outer shroud 86. The vane structure 88 of FIG. 2 includes a plurality of impeller rotor vanes 110, an axial first sidewall 112 and an axial second sidewall 114.

The rotor vanes 110 are arranged circumferentially about the axis 24 in an array. This array of rotor vanes 110 is located radially between (A) the rotor hub 82 and/or the inner shroud 84, and (B) the outer shroud 86. The array of rotor vanes 110 is located axially adjacent and/or radially along the structure sidewalls 112 and 114. Each of the rotor vanes 110 of FIG. 2, for example, extends radially between and to (A) the inner rotor components 82, 84, 112 and 114 and (A) the outer shroud 86. A radial inner portion 116A of each of the rotor vanes 110 extends axially along the axis 24 between and to the first sidewall 112 and the second sidewall 114. The first sidewall 112 is disposed towards (e.g., but, spaced axially from) the structure first side 108. The second sidewall 114 is disposed towards (e.g., but, spaced axially from) the rotor second side 56.

Each of the rotor vanes 110 may include a plurality vane portions. Each rotor vane 110 of FIG. 2, for example, includes the vane inner portion 116A, a radial intermediate portion 116B and a radial outer portion 116C. The vane inner portion 116A is arranged axially between the first sidewall 112 and the second sidewall 114. More particularly, the vane inner portion 116A extends axially between and to the first sidewall 112 and the second sidewall 114. The vane inner portion 116A extends radially between and to (or about) an outer tip of the first sidewall 112 and the rotor bore 106/the inner shroud inner side 102. The vane intermediate portion 116B is arranged radially between the first sidewall 112 and the outer shroud 86. More particularly, the vane intermediate portion 116B extends radially between and to (A) the inner vane portion 116A and the outer tip of the first sidewall 112 and (B) the outer shroud inner side 96. The vane intermediate portion 116B extends axially between and to (or about) the second sidewall 114 and the structure first side 108. The vane outer portion 116C is arranged radially between the second sidewall 114 and the outer shroud 86. More particularly, the vane outer portion 116C extends radially between and to an outer tip of the second sidewall 114 and the outer shroud inner side 96. The vane outer portion 116C extends axially between and to (or about) (A) the second sidewall 114 and the vane intermediate portion 116B and (B) the rotor second side 56.

The impeller rotor 34 includes an internal network of passages formed by at least (or only) the rotor members 82, 84, 86 and 88 within the impeller rotor 34. This network of passages includes a plurality of fluid inlet passages 118, a plurality of liquid outlet passages 120 and a plurality of gas outlet passages 122.

The fluid inlet passages 118 are located towards the structure first side 108. Each of these fluid inlet passages 118 is disposed circumferentially between a circumferentially neighboring (e.g., adjacent) pair of the rotor vanes 110; e.g., between a circumferentially neighboring pair of the vane intermediate portions 116B. Each of the fluid inlet passages 118 projects axially along the axis 24 into the impeller rotor 34 and its vane structure 88 from the structure first side 108 to (or about) the second sidewall 114. Each of the fluid inlet passages 118 may project axially into the impeller rotor 34 and its vane structure 88 from the fluid inlet 22.

The liquid outlet passages 120 are located towards the rotor second side 56. Each of the liquid outlet passages 120 is disposed circumferentially between a circumferentially neighboring (e.g., adjacent) pair of the rotor vanes 110; e.g., between a circumferentially neighboring pair of the vane outer portions 116C. Each of the liquid outlet passages 120 is fluidly coupled with a respective one of the fluid inlet passages 118, and follows a respective (e.g., curved) trajectory within the vane structure 88 to the liquid outlet 26 at the rotor second side 56. The trajectory of each respective liquid outlet passage 120 of FIG. 2 turns around the outer tip of the second sidewall 114. Each of the liquid outlet passages 120 fluidly couples the respective fluid inlet passage 118 to the liquid outlet 26. Each of the liquid outlet passages 120 may project axially into the impeller rotor 34 and its vane structure 88 from the liquid outlet 26. This liquid outlet 26 is disposed radially outboard of and may circumscribe the gas outlet 30.

The gas outlet passages 122 are located intermediately (e.g., midway) axially between the first sidewall 112 and the second sidewall 114. Each of the gas outlet passages 122 is disposed circumferentially between a circumferentially neighboring (e.g., adjacent) pair of the rotor vanes 110; e.g., between a circumferentially neighboring pair of the vane inner portions 116A. Each of the gas outlet passages 122 is fluidly coupled with a respective one of the fluid inlet passages 118, and follows a respective (e.g., curved) trajectory within the vane structure 88 (axially between and radially along the first sidewall 112 and the second sidewall 114) to the gas outlet 30 at the inner shroud inner side 102, which gas outlet 30 may be formed by the rotor bore 106. More particularly, the gas outlet 30 is formed by and extends radially between the shaft outer side 46 and the inner shroud inner side 102. The trajectory of each respective gas outlet passage 122 of FIG. 2 turns around the outer tip of the first sidewall 112. Each gas outlet passage 122 fluidly couples the respective fluid inlet passage 118 to the gas outlet 30/the rotor bore 106. Each of the gas outlet passages 122 may project radially into the impeller rotor 34 and its vane structure 88 from the gas outlet 30.

With the foregoing arrangement, each respective set of passages 118, 120 and 122 forms a forked pathway within/through the impeller rotor 34. An inner leg of the forked pathway extends to the gas outlet 30/the rotor bore 106. An outer leg of the forked pathway extends to the liquid outlet 26. Moreover, each of the fluid inlet passages 118 is fluidly coupled to a respective one of the liquid outlet passages 120 and a respective one of the gas outlet passages 122 in parallel.

Figure 4:
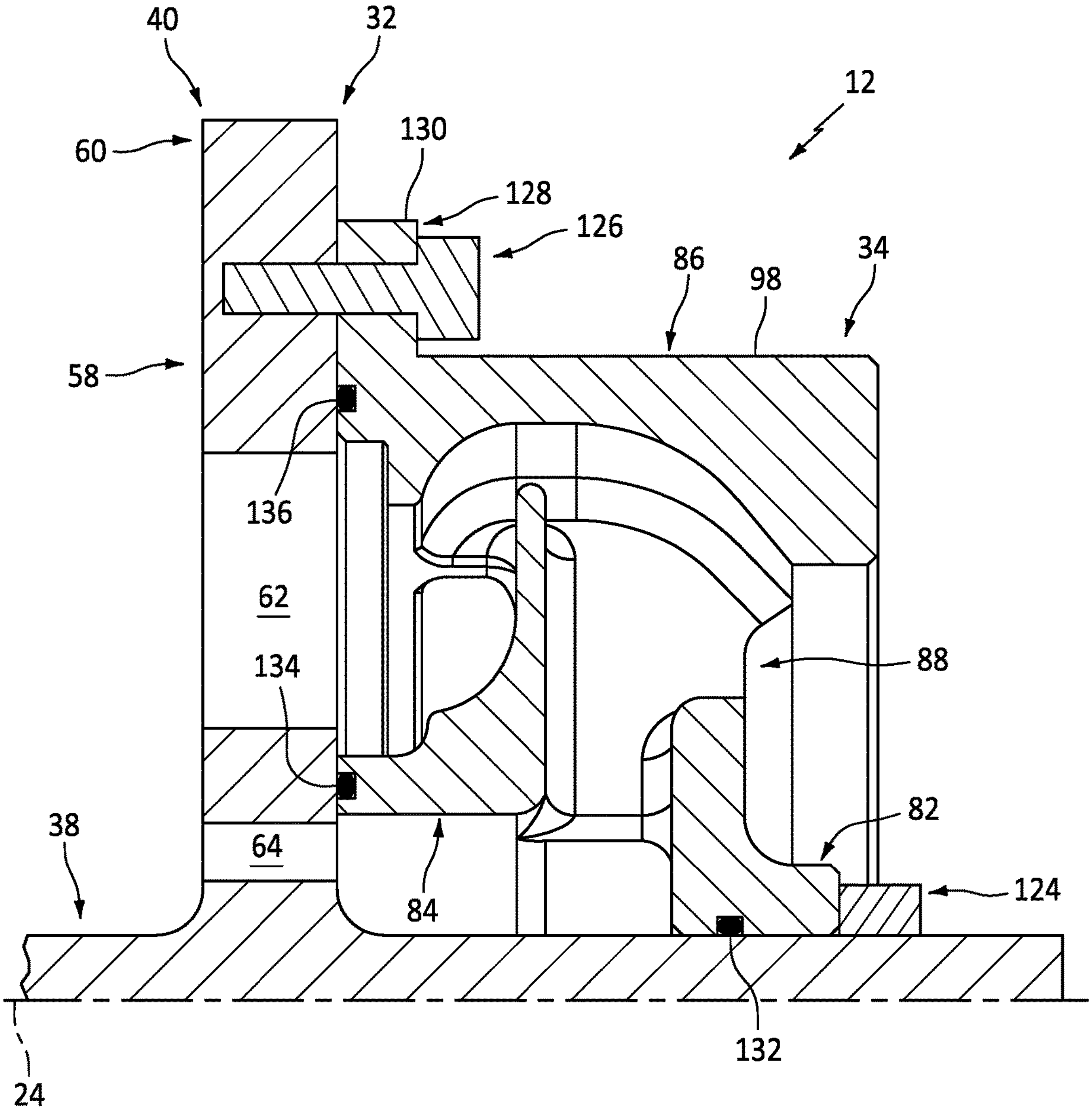
FIG. 4 is a partial sectional illustration of a deaerator impeller rotor mechanically fastened to a deaerator gear rotor.

The impeller rotor 34 is mounted to the gear rotor 32. The rotor shaft 38 of FIG. 2, for example, projects axially away from the rotor gear 40, through an inner bore of the impeller rotor 34, to the shaft first end 42. The impeller rotor 34 and its members 82, 84, 86 and 88 thereby circumscribe the rotor shaft 38. The impeller rotor 34 and its rotor second side 56 are disposed adjacent (e.g., abutted against) and may engage (e.g., contact) the rotor gear 40 and its web 58 at the gear first side 50. The impeller rotor 34 and its rotor hub 82 may be fixed to the gear rotor 32 and its rotor shaft 38 through an interference fit between the rotor hub 82 and the rotor shaft 38. Referring to FIG. 4, the impeller rotor 34 may also or alternatively be clamped axially between (A) the rotor gear 40 and its web 58 and (B) a nut 124, which nut 124 is threaded onto the rotor shaft 38. The impeller rotor 34 may still also or alternatively be mechanically fastened to the rotor gear 40 by one or more fasteners 126; e.g., bolts. Each fastener 126 or FIG. 4, for example, projects axially through an outer flange 128 of the impeller rotor 34 and axially into (or through) the rotor gear 40 and its web 58. Here, the outer flange 128 is connected to (e.g., formed integral with or may otherwise be attached to) the outer shroud 86 at the rotor second side 56, and the outer flange 128 projects radially out from the outer shroud 86 to a distal radial outer end 130 of the outer flange 128. In addition to fastening the impeller rotor 34 to the rotor gear 40, the fastener(s) 126 may also circumferentially orient (e.g., clock) the impeller rotor 34 to the rotor gear 40 and, more particularly, the vane structure 88 and its rotor vanes 110 to the gear web 58 and its ports 62 and/or 64. Of course, this circumferential orientation may also or alternatively be provided using: (a) a splined interface axially between the members 32 and 34 (e.g., between the gear web 58 and one or both of the shrouds 84 and/or 86); (b) a splined interface radially between the members 32 and 34 (e.g., between the rotor shaft 38 and the rotor hub 82); (c) a dog and slot interface between the members 32 and 34; (d) one or more pins; and/or the like.

Referring to FIG. 1, the liquid outlet 26 is fluidly coupled with each of the liquid ports 62. The liquid ports 62 are thereby fluidly coupled to the liquid outlet passages 120 through the liquid outlet 26, and the liquid outlet conduit 16 is fluidly coupled to the liquid outlet 26/the liquid outlet passages 120 through the liquid ports 62. The gas outlet 30 is fluidly coupled with each of the gas ports 64. The gas ports 64 are thereby fluidly coupled to the gas outlet passages 122 through the gas outlet 30, and the gas outlet conduit 18 is fluidly coupled to the gas outlet 30/the gas outlet passages 122 through the gas ports 64.

In some embodiments, referring to FIGS. 2 and 4, a seal element 132 (e.g., an O-ring) may be arranged at an interface radially between the rotor shaft 38 and the rotor hub 82 to prevent or reduce fluid leakage across the rotor hub 82 from the gas outlet 30 to the fluid inlet 22, or vice versa. In addition or alternatively, a seal element 134 (e.g., an O-ring) may be arranged at an interface axially between the inner shroud 84 and the rotor gear 40 and its gear web 58 to prevent or reduce fluid leakage across the inner shroud 84 from the gas outlet 30 to the liquid outlet 26, or vice versa. In addition or alternatively, a seal element 136 (e.g., an O-ring) may be arranged at an interface axially between the outer shroud 86 and the rotor gear 40 and its gear web 58 to prevent or reduce fluid leakage across the outer shroud 86.

Figure 5:
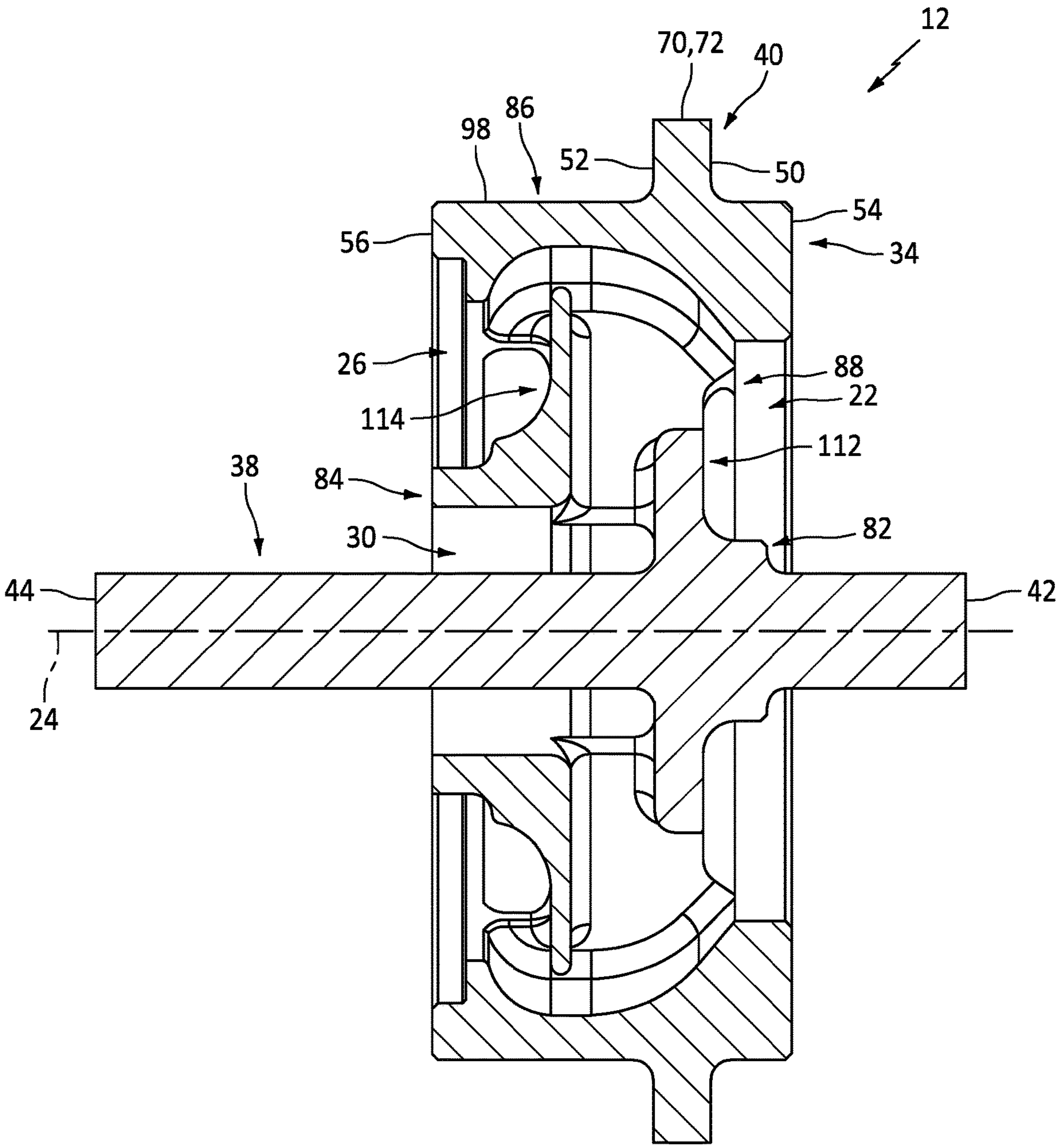
FIG. 5 is a sectional illustration of the deaerator rotating structure configured with a monolithic body.

In some embodiments, referring to FIG. 2, the gear rotor 32 and/or the impeller rotor 34 may each be configured as a monolithic body. Each rotating structure member 32, 34, for example, may be additively manufactured, cast, machined and/or otherwise formed as a single, unitary body. By contrast, a non-monolithic body includes multiple bodies which are discretely formed and attached together following the formation thereof. In other embodiments, referring to FIG. 5, the entire deaerator rotating structure 12 may be configured as a monolithic body, where the impeller rotor 34 and its members 82, 84, 86 and 88 are formed integral with the gear rotor and its members 38 and 40. In the specific embodiment of FIG. 5, the rotor gear 40 is axially aligned with the first sidewall 112. This rotor gear 40 projects radially out from and circumscribes the outer shroud 86. However, it is contemplated the rotor gear 40 may be disposed at other locations axially along the outer shroud 86 between (A) the rotor first side 54/the fluid inlet 22 and (B) the rotor second side 56/the liquid outlet 26 and/or the gas outlet 30. Here, the elements 22, 54 are disposed to (e.g., located towards, and may be axially spaced from) the gear first side 50, and the elements 26, 30, 56 are disposed to (e.g., located towards, and may be axially spaced from) the gear second side 52.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A fluid system for a powerplant, comprising:
a gear rotor rotatable about an axis, the gear rotor including a web, a toothed rim and a plurality of liquid ports, the web projecting radially inward towards the axis from the toothed rim, the toothed rim circumscribing the web, and each of the plurality of liquid ports extending axially through the web; and
a deaerator impeller rotor mounted to and rotatable with the gear rotor about the axis, the deaerator impeller rotor including a fluid inlet, a liquid outlet and a gas outlet, the fluid inlet upstream of and fluidly coupled to the liquid outlet and the gas outlet, and the liquid outlet axially adjacent the gear rotor and fluidly coupled to the plurality of liquid ports;
wherein the gear rotor further includes a plurality of gas ports, and each of the plurality of gas ports extends axially through the web; and
wherein the gas outlet is axially adjacent the gear rotor and fluidly coupled to the plurality of gas ports.

2. The fluid system of claim 1, wherein the deaerator impeller rotor is mounted to the gear rotor by an interference fit between the deaerator impeller rotor and the gear rotor.

3. The fluid system of claim 1, wherein the deaerator impeller rotor is mounted to the gear rotor by one or more bolts.

4. The fluid system of claim 1, wherein the deaerator impeller rotor is mounted to the gear rotor by a nut.

5. The fluid system of claim 1, wherein
the gear rotor further includes a shaft and a gear;
the shaft extends axially through an inner bore of the deaerator impeller rotor; and
the gear includes the web and the toothed rim, and the web projects radially inward towards the axis from the toothed rim to the shaft.

6. The fluid system of claim 5, wherein the gear is formed integral with the shaft.

7. The fluid system of claim 5, wherein a hub of the deaerator impeller rotor is connected to the shaft by an interference fit between the hub of the deaerator impeller rotor and the shaft.

8. The fluid system of claim 5, wherein a flange of the deaerator impeller rotor is connected to the gear by one or more fasteners.

9. The fluid system of claim 5, wherein a hub of the deaerator impeller rotor is mounted on the shaft and clamped axially between the gear and a nut threaded onto the shaft.

10. The fluid system of claim 1, wherein the plurality of liquid ports are disposed radially outboard of the plurality of gas ports.

11. The fluid system of claim 1, wherein the liquid outlet is radially outboard of and circumscribes the gas outlet.

12. The fluid system of claim 1, wherein
the deaerator impeller rotor further includes a vane structure and a network of passages;
the vane structure at least partially forms the network of passages within the deaerator impeller rotor; and
the network of passages fluidly couples the fluid inlet to the liquid outlet and the gas outlet in parallel.

13. The fluid system of claim 12, wherein the network of passages includes at least one of
a fluid inlet passage projecting axially into the deaerator impeller rotor from the fluid inlet;
a liquid outlet passage projecting axially into the deaerator impeller rotor from the liquid outlet; or
a gas outlet passage projecting radially, in a radial outward direction away from the axis, into the deaerator impeller rotor from the gas outlet.

14. The fluid system of claim 12, wherein
the deaerator impeller rotor further includes a shroud, and the vane structure includes a first sidewall, a second sidewall and a plurality of vanes arranged circumferentially about the axis;
the plurality of vanes comprises a first vane, and the first vane includes a first portion, a second portion and a third portion;
the first portion is axially between the first sidewall and the second sidewall;
the second portion is radially between the first sidewall and the shroud; and
the third portion is radially between the second sidewall and the shroud.

15. A fluid system for a powerplant, comprising:
a gear rotor rotatable about an axis, the gear rotor including a web, a toothed rim and a plurality of liquid ports, the web projecting radially inward towards the axis from the toothed rim, the toothed rim circumscribing the web, and each of the plurality of liquid ports extending axially through the web; and
a deaerator impeller rotor mounted to and rotatable with the gear rotor about the axis, the deaerator impeller rotor including a fluid inlet, a liquid outlet and a gas outlet, the fluid inlet upstream of and fluidly coupled to the liquid outlet and the gas outlet, and the liquid outlet axially adjacent the gear rotor and fluidly coupled to the plurality of liquid ports;

wherein at least one of the fluid inlet is an annular fluid inlet into the deaerator impeller rotor;

the liquid outlet is an annular liquid outlet out from the deaerator impeller rotor; or the gas outlet is an annular gas outlet out from the deaerator impeller rotor.

16. A fluid system for a powerplant, comprising:

a gear rotor rotatable about an axis, the gear rotor including a shaft and a gear formed integral with the shaft; and a deaerator impeller rotor fixed to the gear rotor, the deaerator impeller rotor circumscribing the shaft and abutted axially against the gear, the deaerator impeller rotor including a vane structure, a network of passages, a fluid inlet, a liquid outlet and a gas outlet, the vane structure at least partially forming the network of passages within the deaerator impeller rotor, and the network of passages fluidly coupling the fluid inlet to the liquid outlet and the gas outlet in parallel;

wherein the gear rotor includes at least one of a plurality of liquid ports projecting axially through the gear and fluidly coupled to the network of passages through the liquid outlet; or a plurality of gas ports projecting axially through the gear and fluidly coupled to the network of passages through the gas outlet.

* * * * *